(12) United States Patent
Wang

(10) Patent No.: US 7,805,686 B2
(45) Date of Patent: Sep. 28, 2010

(54) METHODS TO GENERATE STATE SPACE MODELS BY CLOSED FORMS FOR GENERAL INTERCONNECT AND TRANSMISSION LINES, TREES AND NETS, AND THEIR MODEL REDUCTION AND SIMULATIONS

(76) Inventor: Sheng-Guo Wang, 2516 Radrick La., Charlotte, NC (US) 28262-4443

( * ) Notice: Subject to any disclaimer, the term of this patent is extended or adjusted under 35 U.S.C. 154(b) by 1086 days.

(21) Appl. No.: 11/500,613

(22) Filed: Aug. 8, 2006

(65) Prior Publication Data

US 2008/0052651 A1 Feb. 28, 2008

(51) Int. Cl.
*G06F 17/50* (2006.01)
(52) U.S. Cl. ............................................. 716/1; 703/19
(58) Field of Classification Search ..................... 716/1, 716/4; 703/19
See application file for complete search history.

(56) References Cited

U.S. PATENT DOCUMENTS

2005/0160387 A1* 7/2005 Wang .............................. 716/4

2009/0012770 A1* 1/2009 Wasynczuk et al. ............ 703/16

* cited by examiner

*Primary Examiner*—Jack Chiang
*Assistant Examiner*—Suchin Parihar

(57) ABSTRACT

There is provided a set of methods for generating state space models of general VLSI interconnect and transmission lines, trees and nets by closed forms with exact accuracy and low computation complexity. The state space model is built by three types of models: the branch model, the connection model and the non-connection model, that are block matrices in closed forms, arranged with topology. The main features are the topology structure, simplicity and accuracy of the closed forms of the state space models {A,B,C,D} or {A,B,C}, computation complexity of O(N) in sense of scalar multiplication times, where N is the total system order, practice of the modeling, ELO model simplification, and their optimization. For evenly distributed interconnect and transmission lines, trees and nets, the closed forms of state space model have the computation complexity of O(1), i.e., only a fixed constant of scalar multiplication times.

20 Claims, 5 Drawing Sheets

An example of general distributed interconnect and transmission tree model

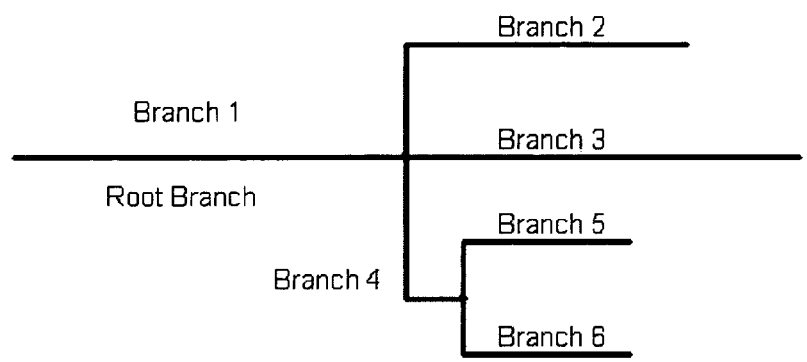
Fig. 1. An example of general distributed interconnect and transmission tree model

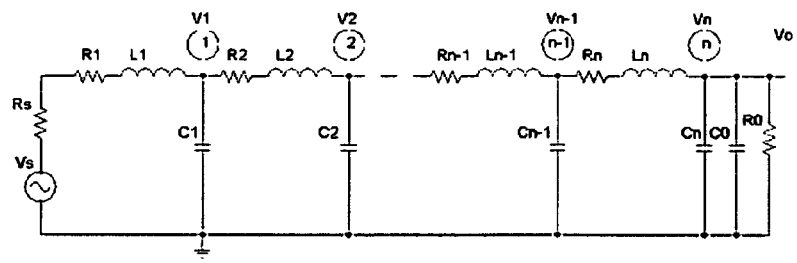
Fig. 2. An RLC interconnect and transmission line model with source and load (BM-1)
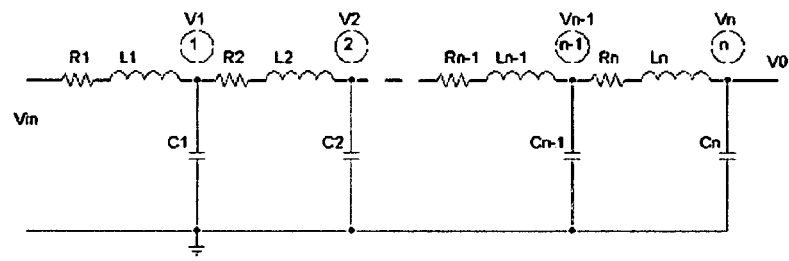
Fig. 3. An RLC interconnect and transmission line model (BM-2)

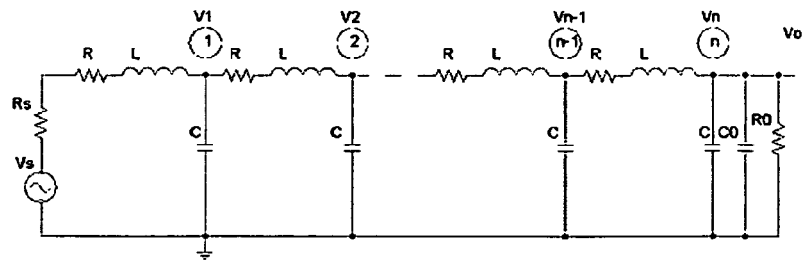
Fig.4. An even RLC interconnect and transmission line model with source & load (BM-3)
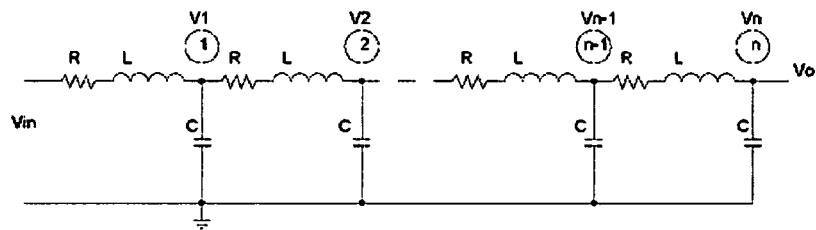
Fig. 5. An even RLC interconnect and transmission line model (BM-4)

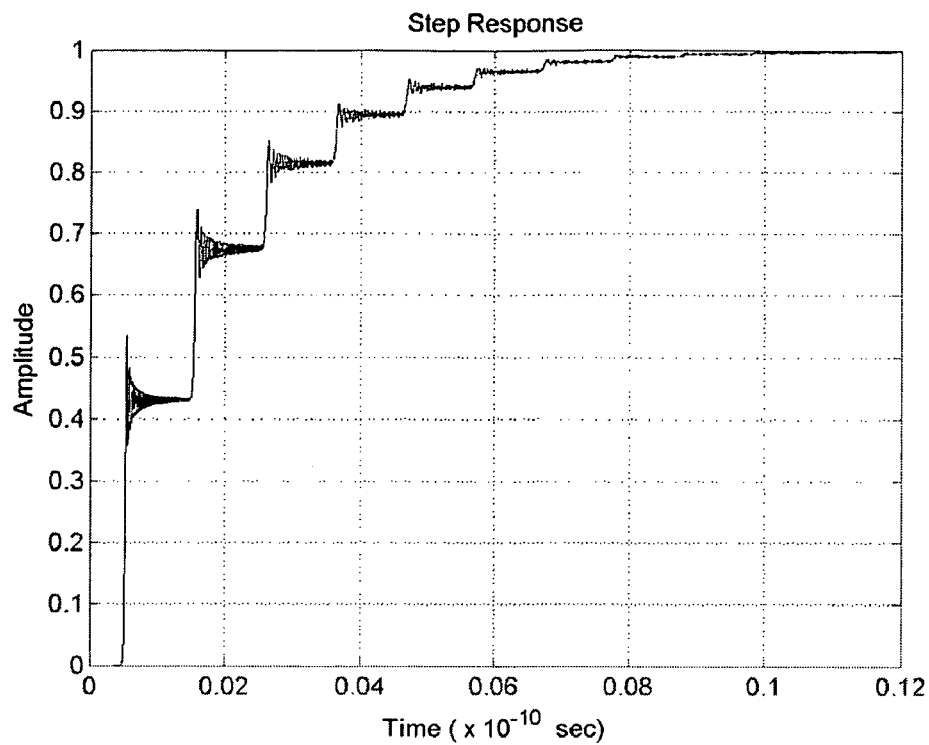
Fig.6. Step response of an example model in BM-3
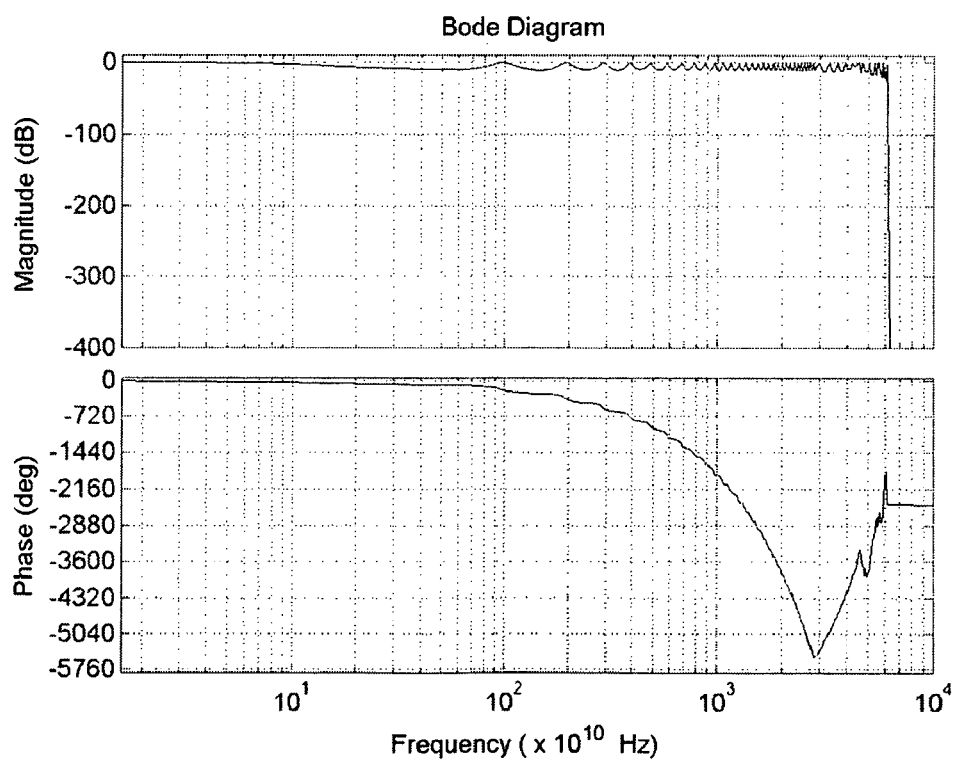
Fig.7. Bode plot of an example model in BM-3

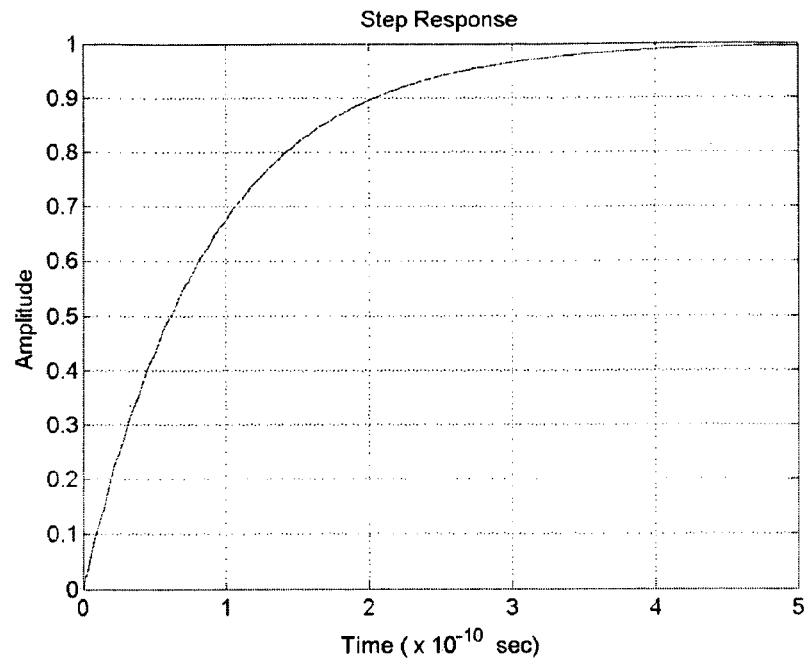
Fig.8. Step responses of a 900th order model and its 18th order ELO model in Case 2
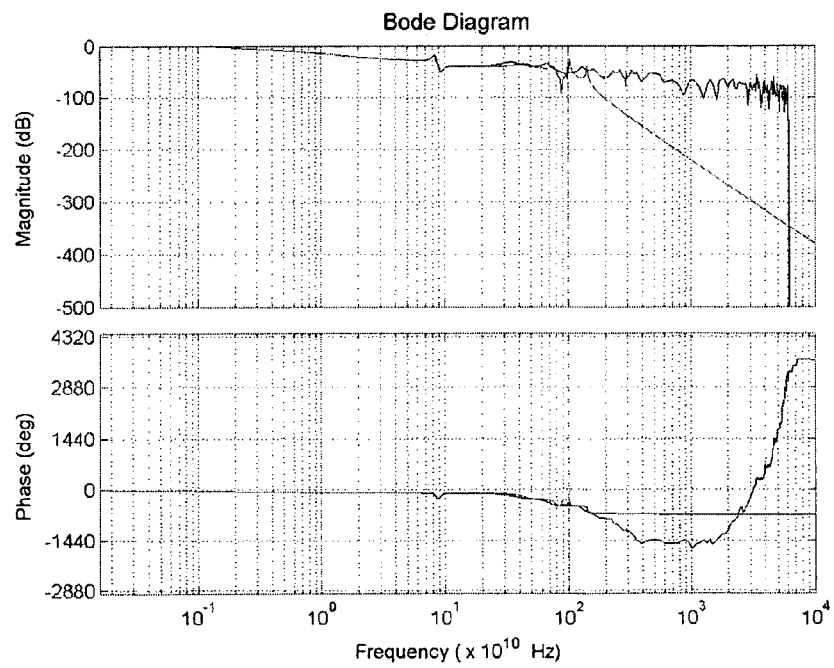
Fig.9. Bode plots of a 900th order model and its 18th order ELO model in Case 2

METHODS TO GENERATE STATE SPACE MODELS BY CLOSED FORMS FOR GENERAL INTERCONNECT AND TRANSMISSION LINES, TREES AND NETS, AND THEIR MODEL REDUCTION AND SIMULATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to general interconnect and transmission lines, trees and nets, and methods to obtain their state space models in time domain, and their simulations for their characteristics and evolution, and their practice for various model reduction methods, and optimization methods.

2. Description of the Related Art

With the rapid increase of integration level and speed, IC interconnect has become one of important limiting factors of today's VLSI circuit design performance. It has been commonly recognized that interconnect delay dominates gate delay in current deep submicron VLSI circuits. The average length of the chip interconnect and the chip area occupied by interconnect are both increasing. With the continuous scaling of technology and increased die area, especially the chip operation speed increasing, that situation is becoming worse. The advance of high-speed deep-submicron VLSI technology requires chip interconnect and packaging to be modeled by distributed circuits [Reed and Rohrer, Applied Introductory Circuit Analysis, Prentice Hall, 1999; Wang, patent application Ser. No. 11/037,636, 2005]. Such a detailed modeling level eventually results in large scale linear RLC or RC circuits to be analyzed.

In transmission line area, it is also well know that the transmission line should be modeled as distributed circuits, resulting in large scale linear RLC or RC circuits. When the chip speed is increased fast, the inductor characteristics of interconnect and transmission line, tree and net, denoted in short as ITLTAN, must be considered. For example, in deep submicron interconnects, on-chip inductive effects arising due to increasing clock speeds, increasing interconnect lengths, and decreasing signal rise times. With the continuous development of technology, especially the chip operation speed increasing, that situation becomes an urgent challenge to VLSI performance analysis and design.

In order to design complex VLSI circuits properly, accurate characterization of the interconnect behavior and signal transients is required. That is especially true with VLSI, in which hundreds of thousands of circuit elements can be placed on a single chip, and with ULSI, in which millions of circuit elements can be placed on a single chip. Thus, the need for more accurate and faster modeling technique is not only very desired but also much required in design and analysis. An effort of reducing the circuit order is then necessary in order to evaluate the circuit performance and characteristics in a reasonable time period, as required by real design practice. In circuit design, fast and accurate computer simulation of the behavior of the circuit is important.

Interconnect in a VLSI circuit is usually structured in a tree or a net, especially a tree, where a line as a special tree is a basic component. Thus, the process of characterizing signal waveforms in a tree structured interconnect is of primary importance, after a single line is treated.

There are various model reduction methods, such as Elmore delay model, AWE (Asymptotic Waveform Evaluation) for timing analysis, PVL (Padé approximation via Lanczos approach), Klyrov space decomposition, Klyrov-Arnoldi-based reduced-order modeling, BTM (Balance Truncation Method), and even length-division order (ELO) modeling.

However, all model reduction methods in the state space need to start from an accurate state space high order models in order to result in a good model reduction.

The original accurate models in the state space are important not only as a basis of an accurate starting point for various model reduction methods, but also as a basis of performance comparison for checking the approximation of various model reduction methods.

It is noticed that to get an accurate state space model for the starting point has significantly high computational complexity as shown as follows, in addition to the high computation complexity of model reduction techniques themselves. It is well known that an RC and RLC ITLTAN can be described as the following differential equation in matrix form based on the KCL or KVL:

$$Gx(t) + C_{LC}\frac{dx(t)}{dt} = bu(t) \quad (1)$$

where G and $C_{LC}$ are parameter matrices related to the parameters of resistors, capacitors and inductors of the ITLTAN and its structure, u(t) is the input source vector, and x(t) is a vector of the node voltages and inductor currents or the node voltage derivatives. The state space model {A, B, C, D} of a general ITLTAN is in $$\dot{x}(t)=Ax(t)+Bu(t), y(t)=Cx(t)+Du(t) \text{ or } y(t)=Cx(t), \quad (2)$$

where the state variable $x(t) \in R^N$, input variable u(t), output variable y(t), the order N is the number of capacitors and inductors in the circuit (ITLTAN), the matrices {A, B, C, D} are the system matrix, input matrix, output matrix and direct output matrix, respectively. Since D=0 as usual, the model may omit D as {A, B, C} in (2). The first equation in (2) is the system equation that is a differential equation, and the second equation in (2) is the output equation that is an algebraic equation. It is known that the BTM based order reduction method needs to start from (2). Furthermore, the motivation of the present invention is not only to provide a starting point for the BTM, but also to provide a new approach for various model reduction methods, and to reveal the characteristics of the ITLTAN, because the system equation determines the dynamics of the ITLTAN circuits, the system matrix determines the characteristics of the ITLTAN circuits, and its eigenvalues determine the time responses to the input signals.

However, it is apparent from equation (1) that the calculation of inverse of matrix $C_{LC}$, or matrix decomposition (e.g., LU decomposition), and multiplication of $C_{LC}^{-1}$ with matrix G and vector b, are necessary to get matrix A and matrix B in the state space model. From the well known results, the computation complexity of these approaches is $O(N^2) \sim O(N^3)$ depending on the matrix structure and the approaches. For very high order system, the matrix inverse calculation leads to calculation singularity problem due to bad condition number of the matrix, making a calculation problem. Note that N should be as large as we can for approaching to a distributed model, and on the other hand, it can be in the order of thousands for a typical large industrial tree or net.

It is noticed that the limited number of orders or poles is inappropriate to evaluate the transient response at the nodes of underdamped RLC ITLTAN, which require a much higher order model to accurately capture the transient response. Moreover, highly accurate estimation of signal transients within a VLSI circuit is required for performance-critical models and the ITLTAN, and to accurately anticipate possible hazards during switching.

An exact original high order model is much important not only as a starting point for all model reduction methods, but also as an evaluation criterion for all reduced order models. However, due to very large size of the original model, an important and difficult aspect is how to have a method get its original model in a suitable time and cost-less calculation time.

The way to find this distributed linear model is usually from the s-domain by Kirchhoff's law and algebraic equations, or from the time domain by Kirchhoff's law and differential equations. However, it is bound to meet calculation of so-high dimension matrix inverse in conventional methods. Due to the distributed interconnect characteristics, the size is very large, e.g., a $10^6 \times 10^6$ matrix, it is desired to have an elegant closed-form of the state space model for the general distributed ITLTAN to dramatically reduce the computation complexity. Moreover, simulations based on these models can be developed to capture the transient response in exact or arbitrary accuracy.

Patent applications (Ser. Nos. 11/037,636 and 11/037,701) of the inventor have presented approaches for generating the state space models by closed forms for RLC and RC interconnect lines respectively. It was the first time to address that open problem by the closed form. Those inventions mainly address a line-structure, i.e., only a special tree-type and/or a component of tree or net structure.

Thus, it is still a broad open problem: how to generate the state space model by its closed form for general ITLTAN. There is no any systematic method to provide state space model via the closed form approach for the general interconnect and transmission tree or net in the literature.

In addition to the above open problem, another question is that: can we present other state space closed form for formulating the state space model of RLC interconnect and transmission lines?

In all, current conventional methods are lack of an elegant way to get exact original high order state space model of the distributed ITLTAN in either tree-structure or net structure.

SUMMARY OF THE INVENTION

In light of the above, this invention is for general ITLTAN circuit, and the analysis method and system which can accurately capture the original model and the transient responses in a computationally efficient manner via the state space model in closed form.

It is a primary object of the invention to provide a method and system for generating an exact accurate State Space Model by an efficient and elegant Closed Form in time domain for the general ITLTAN.

It is another objective of the invention to provide the exact models as a basis for evaluating the transient response of a general ITLTAN using various existing model reduction/approximation methods and the herein developed methods.

It is another objective of the invention to provide a method and a system and a base for developing a simple model simplification method, and/or searching an optimized model reduction/simplification of a general ITLTAN, by using the above mentioned exact accurate models together with the developing model simplification method, and/or various model reduction methods.

It is another object of the invention to provide such said methods and system which can do so in a computationally efficient manner.

It is yet another object of the invention to provide such a method and system of the model reduction having a high degree of stability in terms of both numerical stability and pole stability and physical synthesizable.

In methodology, it is another addition objective of the invention to present a method and system for building the closed forms of the state space models for the general ITLTAN, by locating block-models, e.g., branch (line) model, connection model, and non-connection model, with the topological structure of the ITLTAN.

In short, it is a key objective of this present invention to provide exact accurate N-th order models and their simple algorithms of the general ITLTAN by said closed form of the state space model in time domain based on the topologies. The main features include the exact accuracy of the models, high efficiency of the algorithms, and elegant topologies of the models.

To achieve the above and other objects, the present invention is directed to a set of methods and system for generating the exact accuracy original models of the general ITLTAN in time domain in a computationally efficient way, with very low computation complexity, e.g., O(N) where the computation complexity is defined as the times of scalar multiplications, which is in a more detailed level than the conventional definition as the times which the method traverses nodes or components. For the proposed ELO model simplification on the distributed ITLTAN, the closed form of state space model has its computation complexity of only O(M), where M is the reduced order of the ELO simplified model, i.e., M<N or M<<N. Moreover, for evenly distributed ITLTAN, the closed form of state space model of either original model or the ELO model has its computation complexity of only O(1), i.e., only a fixed constant. The present invention also has guaranteed stability properties for low or high order approximations as compared to the AWE. Thus, it is a very useful feature for the ITLTAN.

We may call a line, or a tree, or a net just as a net, in short, which includes the line, tree or net. The method and system to generate an original state space model for an interconnect or transmission net (ITN circuit) is summarized as follows to include the following steps of:

(a) forming the ITN as predetermined k branches connected in a topology of a tree or net;

(b) setting a model order for each branch, denoted as $N_i$, $i=1, \ldots, k$, then the system model order N of said tree or net is the sum of the branch orders, i.e., $$N = \sum_{i=1}^{k} N_i;$$

(c) building an N×N system matrix A which is formed by a type of branch block matrices, a type of connection block matrices, and a type of non-connection block matrix;

(d) building an input matrix B having an N×1 column vector which has a non-zero entry that is based on a circuit parameter of the branch which is directly connected to a source;

(e) building an output matrix C having an 1×N row vector which has one non-zero entry for selecting an output variable of said tree or net;

(f) forming the time-domain state space model {A, B, C} by said matrices A, B and C with respective appropriate dimensions;

whereby the state variable vector and the output variable of the time-domain state space model follows the state space equations in (2), and the state space model is established by these branch block matrices, connection block matrices, and non-connection block matrix. Here, the above mentioned matrix may be a vector or a scalar when its dimension is in degeneration.

Therefore, a general ITLTAN is divided as k branches which connected at their respective connection nodes based on their topological structure to form said general ITLTAN. FIG. 1 shows an example of a general ITLTAN as a tree type. It has six branches: branch 1 through branch 6. The source is connected to branch 1, which is called the root branch of the ITLTAN. The tree has its root branch downward to the leaf branches as usual. The root branch 1 has three leaf branches 2, 3 and 4. Then, the sub-root branch 4 has its two sub-leaf branches 5 and 6. For convenience, they also call root branch 4 and leaf branches 5 and 6 for their connection relationship.

There are three different types of models: a type of branch models, a type of connection models and a type of non-connection model in generating the state space model of the general ITLTAN. Here, the connection and non-connection of two branches mean the direct connection and no direct connection between these two branches, respectively.

The above each model type may have one or more different models. Actually, all these models, or sub-models, for generating the state space model of the ITLTAN are block matrices with their appropriate dimensions to form the state space model by their respective closed forms. For example, the branch model type may have a model of unevenly distributed interconnect and transmission branch (line) with its external parameters, a model of unevenly distributed branch (line) without its external parameters, i.e., itself, a model of evenly distributed branch (line) with its external parameters, and a model of evenly distributed branch (line) without its external parameters. For convenience, we may also call them branch model 1 through branch model 4, respectively, as BM-1 through BM-4.

The connection model type may have a model of root-to-leaf connection, as root-leaf connection model in short, a model of leaf-to-root connection, as leaf-root connection model, and a model of leaf-to-leaf connection, as leaf-leaf connection model. We also call them CM-1 (CM-R-L), CM-2 (CM-L-R), and CM-3 (CM-L-L), respectively. The root-leaf connection model contributes to the description of the root branch state variable dynamics, while leaf-root connection model contributes to the description of the leaf branch variable dynamics.

The non-connection model type may have one easy model, i.e., a zero block matrix for description no connection for these two branches. We call it NCM.

One method based on the above general method for generating the state space model for the general ITN is further as follows:

(a) the branch block matrix has its dimension of $N_i \times N_i$ for each branch i=1 ..., k, respectively;

(b) the connection block matrices respectively have dimensions of $N_i \times N_j$ and $N_j \times N_i$ for two directly connecting branches i and j, where i≠j, and i, j∈{1, ... k};

(c) the non-connection block matrices respectively have dimensions of $N_i \times N_j$ and $N_j \times N_i$ for two non-directly-connected branches i and j, where i≠j, and i, j∈{1, ..., k}, and they are zero block matrices;

(d) said system matrix A has a topological structure corresponding to the topology of said tree or net as follows: said matrix A is formed by k×k block matrices, say $A_{ij}$, i, j=1, ..., k, said branch block matrix is set at the diagonal of said matrix A, say $A_{ii}$, i=1, ..., k, for the branches i=1, ..., k, respectively, the matrix $A_{ij}$, i≠j, is a connection or non-connection block matrix if the branches i and j are directly connected or not directly connected, respectively;

Please notice that the direct output matrix D as usual is a zero matrix for the model {A, B, C, D}.

Each branch has its state space model by the closed form, as the branch model. The branch model has its branch system matrix model, branch input matrix model, and branch output matrix model.

As mentioned above, the term matrix includes its special cases, e.g., a vector, 1×1 or 1×1 matrix, or a scalar, a 1×1 matrix, i.e., its degeneration, depending on its dimension. This concept is used for generality and simplicity in terms. Also, all models are just block matrices, i.e., matrices.

The connection model has its connection system matrix model in closed form to contribute to the system matrix of the state space model of the ITLTAN. Also, the non-connection model has its non-connection system matrix model in closed form to contribute to the system matrix of the state space model of the ITLTAN. They are used for describing relationship between connected or non-connected branches, respectively.

The state space model of the ITLTAN is built by these said models directly based on the topological structure of the ITLTAN.

Consider an ITLTAN with k branches, each branch i, i=1, ..., k, has its degree $N_i$, respectively. The total ITLTAN degree is $$N = \sum_{i=1}^{k} N_i \tag{3}$$

The state space model of the ITLTAN is $$\dot{x}(t)=Ax(t)+Bu(t), y(t)=Cx(t)+Du(t) \text{ or } y(t)=Cx(t), \tag{4}$$

which has the following block-matrix format:

$$A = [A_{ij}]_{\substack{i=1,\cdots,k \\ j=1,\cdots,k}}, B = [B_1^T \cdots B_k^T]^T, C = [C_1 \cdots C_k], \tag{5}$$

$$A \in R^{N \times N}, A_{ij} \in R^{N_i \times N_j}, B \in R^{N \times 1}, B_i \in R^{N_i \times 1}, C \in R^{1 \times N},$$
$$C_i \in R^{1 \times N_i}, D \in R \tag{6}$$

where the input matrix B is shown for the single input source, and the output matrix C is shown for a single output, and the direct output matrix D is for single-input single-output. However, we point out that if multi-sources input is considered, the above input matrix B can be extended to be a matrix with its column number as same as the number of the multi-sources. Also, if the multi-output variables are selected, the above output matrix C can be extended to be a matrix with its row number as same as the selected multi-output variable number. Correspondingly, matrix D can be extended to $D \in R^{q \times p}$ for p-input q-output situation with $B \in R^{N \times p}$ and $C \in R^{q \times N}$. However, as usual D=0, so the model may omit D as $\{A, B, C\}$ instead of $\{A, B, C, D\}$.

The above block matrices $A_{ij}$ are from above said system matrix models, matrices $B_i$ are from the branch input matrix models, matrices $C_i$ are from the branch output matrix models, and matrix D elements are from the circuit directly if there is a direct connection between the source and the select output. If no source direct output (as a common case), the direct output matrix D is a zero matrix.

Furthermore, one arrangement can be as follows. The diagonal block matrices $A_{ii}$, i=1, ..., k, are selected from the branch models. The non-diagonal block matrices $A_{ij}$, where i≠j, i, j=1, ..., k, are selected from connection models or non-connection models. If branch i and branch j are connected as a root-leaf connection, then matrix $A_{ij}$ is selected from the CM-R-L model, while matrix $A_{ji}$ is selected from the CM-L-R model. If branch i and branch j are connected as a leaf-leaf connection, matrix $A_{ij}$ is selected from the CM-L-L model. If branch i and branch j are not connected, matrix $A_{ij}$ is selected from the NCM, i.e., a zero matrix. The block matrices $B_i$ are from the branch input matrix model, and the block matrices $C_i$ are from the branch output matrix model, i=1, ..., k. However, the input matrix B and the output matrix C may also directly determined from the source connection and the selected output.

In view of the characteristics of said open problem, it is very clear that the above invention methods are not only unobvious, but also useful, because it keeps topology. Based on the above proposed methods, we can further develop these models and rules for the ITLTAN. Now, the state space models of the generate ITLTAN are built by these models in closed form.

The above block matrix position arrangement may have different arrangements, such as any equivalent position arrangement by a similarity transformation of any non-singular matrix T, as $$\{A, B, C, D\} \xrightarrow{T} \{T^{-1}AT, T^{-1}B, CT, D\} \text{ with } x(t) \xrightarrow{T} Tx(t) \quad (7)$$

which include elementary transformation, i.e., relocating the blocks positions at the block-level, or evenly relocating the rows and columns within a block.

The corresponding time domain analysis and frequency domain analysis can be easily executed by the derived state space closed-forms such as by function command step and bode in MATLAB.

In consideration of model reduction for the general ITLTAN, one good and powerful way is to keep the same topological structure as the original model, i.e., the same branch number and same branch connection relationship. However, the degree of each branch is reduced with new element parameters. Thus, it is a good and powerful synthesizable and implemented model with a reduced order, say an M-th order model, instead of its original very high N-th order model by modeling each branch order as $M_i < N_i$, thus $$M = \sum_{i=1}^{k} M_i < \sum_{i=1}^{k} N_i = N.$$

Thus, one method for generating a time-domain reduced order state space model of an interconnect or transmission tree or net for simulation, or performance analysis, or model reduction, or circuit design, includes the steps of
(a) forming the interconnect or transmission tree or net as predetermined k branches connected as the topology of said tree or net;
(b) setting a small order $M_i$, which is not larger than its original order, for branch i, i=1, ..., k, then the reduced order M of system model of said tree or net is $$M = \sum_{i=1}^{k} M_i;$$

(c) building an M×M system matrix A which is formed by a type of branch block matrices, a type of connection block matrices, and a type of non-connection block matrix;
(d) building an input matrix B having an M×1 column which has a non-zero entry that is based on a circuit parameter of the branch that is directly connected to a source;
(e) building an output matrix C having an 1×M row which has one non-zero entry for selecting an output variable of said tree or net;
(f) forming the time-domain reduced order state space model $\{A, B, C\}$ by said matrices A, B and C with respective appropriate dimensions, which have been reduced from the original model;

whereby the state variable vector and the output variable of the time-domain state space model follows the state space equations in (2), and the state space model is established by these reduced order branch block matrices, connection block matrices, and non-connection block matrices.

We may further develop an ELO model simplification for each branch. It means that the reduced order branches are evenly distributed branches by using the above mentioned corresponding models. The above said closed forms can be used for analysis of approximation models of the M-th order parasitic ITLTAN by even length division in model reduction.

We call this M-th order model as Even Length Order (ELO) simplification (or simplified/reduced) model of the ITLTAN. Thus, the above presented methods can be used for generation and evaluation of the ELO simplification models of ITLTAN.

The above method may be further with an optimization process, i.e., the reduced order models described above with the optimized parameters such that a preselected optimal performance index is minimized.

Variations of the present invention can include a combination of any partial invention in the present invention and any current conventional method of the ITLTAN modeling and analysis and reduction, or any mixture of current conventional method of ITLTAN modeling and analysis.

BRIEF DESCRIPTION OF THE DRAWINGS

FIG. 1 shows an example of the general interconnect and transmission tree or net.

FIG. 2 shows a general RLC interconnect and transmission line circuit with a source resistor and a load resistor and a load capacitor (BM-1);

FIG. 3 shows a general RLC interconnect and transmission line circuit itself (BM-2);

FIG. 4 shows an evenly distributed RLC interconnect and transmission line with a source resistor and a load resistor and a load capacitor (BM-3);

FIG. 5 shows an evenly distributed RLC interconnect and transmission line itself (BM-4);

FIG. 6 shows the step transient response evaluated for an example RLC interconnect line (BM-3);

FIG. 7 shows the Bode plot evaluated for an example RLC interconnect line (BM-3);

FIG. 8 shows the step transient responses evaluated for an example of order 900 of RLC interconnect tree as FIG. 1 and its ELO simplified model of order 18;

FIG. 9 shows the Bode plot evaluated for the above example in FIG. 8.

DETAILED DESCRIPTION OF THE PREFERRED EMBODIMENTS

The present invention will now be further set forth in detail below, in addition to the above described in the summary section. However, we emphasize again that the described models may have their respective equivalent forms, e.g., some entry position change by elementary transform, i.e., exchange of their rows and/or their columns. The invention certainly includes these various types of transformed closed forms.

The rules governing and the methods finding the state space model structure and parameters for the general ITLTAN are defined in the said closed forms in the above summary section. The following subsections will further address that. Subsection A further addresses the branch models. Subsection B further discusses the connection models and non-connection model. Subsection C further discusses the methods for the ITLTAN. Notice that these closed form parameters of the state space model are from the physical parameters of the considered ITLTAN. Subsection D further addresses the methods for the model reduction of the ITLTAN, especially the ELO model simplification for the branch models and the ITLTAN, and their models approximation and optimization. Subsection E discusses transient response and frequency response. The stability and complexity characteristics of the methods are described in subsection F. Finally experimental results are given in subsection G.

A. Calculating the State Space Models via Closed Forms for Various Branches

The above section has presented the rules and methods for generating the branch models. The branch model type includes four different models. We address them further in detail, especially for a distributed RLC interconnect and transmission line, a general ITLTAN branch. Here the method for the branch model may be used not only for the ITLTAN as a branch model, but also for a single general interconnect and transmission line, a special tree.

The branch model is one important model type for the ITLTAN. The branch model is a line model as discussed in Ser. Nos. 11/037,636 and 11/037,701. So, it may be a choice to utilize those state space closed form models. Here, a new closed-form of the state-space model of the general RLC interconnect and transmission line is presented as a proposed branch model. The key feature is that the non-zero entries of its system matrix are only on its tri-diagonal lines.

A.1. Branch Model 1 (BM-1)—with its Source and Load Parts

A general branch model of the ITLTAN is BM-1 as shown in FIG. 2. The order of the distributed circuits is assumed as 2n as general for distributed RLC interconnect and/or transmission line, i.e., $N_i=2n$. For simplicity, we omit the branch subscript index without loss of any generality. It also implies that the results are valid for a single line as well. Thus, the RLC interconnect and transmission line has n pieces/sections as shown in FIG. 2, each having a resistor and an inductor in series between two neighbor nodes and a capacitor from the node to the ground. The input port is with a source voltage $v_{in}(t)$ and the output port is then with a voltage $v_o(t)$. Their distributed resistances, inductance and capacitance are denoted as $R_i$, $L_i$ and $C_i$, $i=1, \ldots, n$, respectively. The subscripts represent their section index and may be ordered from the input terminal to the output terminal, or vise versa. The nodes and their voltages are also numbered in this way as node i and its voltage $v_i(t)$, $i=1, \ldots, n$. Each section i has a section current $i_i(t)$ passing its section inductor $L_i$ and resistor $R_i$, $i=1, \ldots, n$. This general interconnect/transmission branch line has a source resistor $R_s$, a load resistor $R_0$ and a load capacitor $C_0$; We call this Branch Circuit Model 1 [BM-1] in FIG. 2.

Take the state variable vector x(t), the input variable u(t), and the output variable y(t), respectively, such as $$x(t)=[i_1(t), v_1(t), v_2(t), \ldots, i_n(t), v_n(t)]^T, u(t)=v_{in}(t),$$
$$\text{and } y(t)=v_o(t)=v_n(t), \quad (8)$$

where the state variable $x(t) \in R^{2n}$, the input variable $u(t) \in R$ and the output variable $y(t) \in R$ for the considered distributed interconnect circuit. The output y(t) can be selected as any state of state vector x(t), e.g., any internal node voltage $v_i(t)$ or any section current $i_i(t)$, or their combination, or multi-selections that makes y(t) as a vector in stead of a scalar by extension. Then, its spate space model {A, B, C, D} or {A, B, C} of the distributed RLC circuit in FIG. 2 is as follows:

$$x(t)=Ax(t)+Bu(t) \text{ and } y(t)=Cx(t)+Du(t) \text{ or } y(t)=Cx(t) \quad (9)$$

$$A = \begin{bmatrix} -(R_s+R_1)/L_1 & -1/L_1 & 0 & 0 & \cdots & \cdots & \cdots & \cdots & \cdots & 0 \\ 1/C_1 & 0 & -1/C_1 & 0 & \cdot^{\cdot^{\cdot}} & & & & & \vdots \\ 0 & 1/L_2 & -R_2/L_2 & -1/L_2 & 0 & \cdot^{\cdot^{\cdot}} & & & & \vdots \\ \vdots & 0 & 1/C_2 & 0 & -1/C_2 & 0 & \cdot^{\cdot^{\cdot}} & & & \vdots \\ \vdots & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & & & \vdots \\ \vdots & & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & & \vdots \\ \vdots & & & \cdot^{\cdot^{\cdot}} & \cdot^{\cdot^{\cdot}} & 1/L_{n-1} & -R_{n-1}/L_{n-1} & -1/L_{n-1} & 0 & 0 \\ \vdots & & & & \cdot^{\cdot^{\cdot}} & \cdot^{\cdot^{\cdot}} & 1/C_{n-1} & 0 & -1/C_{n-1} & 0 \\ \vdots & & & & & \cdot^{\cdot^{\cdot}} & 0 & 1/L_n & -R_n/L_n & -1/L_n \\ 0 & \cdots & \cdots & \cdots & \cdots & \cdots & \cdots & 0 & 1/(C_n+C_0) & -1/(C_n+C_0)R_0 \end{bmatrix} \quad (10)$$

$$B = [1/L_1 \ 0 \vdots 0 \ \cdots \ \cdots \ 0]^T, \quad (11)$$
$$C = [0 \ \cdots \ \cdots \ 0 \vdots 0 \ 1]$$
and
$$D = 0 \text{(or omit } D\text{)}$$

where $A \in R^{2n \times 2n}$, $B \in R^{1 \times 2n}$, $C \in R^{2n \times 1}$, and $D \in R$, or we omit D. It is a closed form of the exact state space model for the 2n-th order distributed RLC interconnect and transmission line in FIG. 2, i.e., Branch Model 1, where n>>1 usual. However, it is also valid for any n>1.

For a special case n=1, the above model is reduced to the follows:

$$A = \begin{bmatrix} -(R_s+R_1)/L_1 & -1/L_1 \\ 1/(C_1+C_0) & -1/(C_1+C_0)R_0 \end{bmatrix}, \quad (12)$$

$$B = [1/L_1 \ 0]^T,$$

$$C = [0 \ 1].$$

It usually relates to the model reduction with order two, while the distributed interconnect characteristics is represented by a very large order 2n (or $2n_i$ for branch i).

The direct output matrix D is 0 matrix (or a scalar) as usual, so we may omit it.

The input matrix B has only one non-zero element in the first row $$b_1 = 1/L_1. \quad (13)$$

The output matrix C has one nonzero entry 1 in the 2n-th column as usual to select one state variable as an output. For example, if the i-th node voltage is needed, the output matrix C can be set as $$C = [0 \ldots 1 \ldots 0], \text{ i.e., } c_{2i} = 1 \quad (14)$$

with its 2i-th entry as 1, and all other entries as 0. Thus, this state space model can check any node voltage or any section current by adjusting its output matrix C.

Then, by the above described state space model of the ITLTAN in closed form, the present invention can check any node voltage, as well as any section current (e.g., the current of

A.2. Branch Model 2 (BM-2)—Without Load and Source Parts

FIG. 3 shows a BM-2, that is an RLC interconnect and transmission line itself, without any disturbance or distortion from various source and load parts. This case is particularly important since it describes the propagation delay characteristics of a distributed RLC line without any distortion of the load gate impedances and source impedances.

Branch Model 2 [BM-2] in FIG. 3 can be viewed as a special case of BM-1 in FIG. 2 by setting the source resistor and load capacitor to be zero and the load resistor to be infinite as $$R_s = 0, \ C_0 = 0, \text{ and } 1/R_0 = 0. \quad (15)$$

The state space model of the BM-2 in a closed form is as follows:

$$A = \begin{bmatrix} -R_1/L_1 & -1/L_1 & 0 & 0 & \cdots & \cdots & \cdots & \cdots & \cdots & 0 \\ 1/C_1 & 0 & -1/C_1 & 0 & \cdot^{\cdot^{\cdot}} & & & & & \vdots \\ 0 & 1/L_2 & -R_2/L_2 & -1/L_2 & 0 & \cdot^{\cdot^{\cdot}} & & & & \vdots \\ \vdots & 0 & 1/C_2 & 0 & -1/C_2 & 0 & \cdot^{\cdot^{\cdot}} & & & \vdots \\ \vdots & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & & & \vdots \\ \vdots & & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & & \vdots \\ \vdots & & & \cdot^{\cdot^{\cdot}} & \cdot^{\cdot^{\cdot}} & 1/L_{n-1} & -R_{n-1}/L_{n-1} & -1/L_{n-1} & 0 & 0 \\ \vdots & & & & \cdot^{\cdot^{\cdot}} & \cdot^{\cdot^{\cdot}} & 1/C_{n-1} & 0 & -1/C_{n-1} & 0 \\ \vdots & & & & & \cdot^{\cdot^{\cdot}} & 0 & 1/L_n & -R_n/L_n & -1/L_n \\ 0 & \cdots & \cdots & \cdots & \cdots & \cdots & \cdots & 0 & 1/C_n & 0 \end{bmatrix} \quad (16)$$

$$B = [1/L_1 \ 0 \vdots 0 \ \cdots \ \cdots \ 0]^T, \quad (17)$$
$$C = [0 \ \cdots \ \cdots \ 0 \vdots 0 \ 1]$$
and
$$D = 0.$$

Here, the branch input matrix, output matrix and direct output matrix in (17) are the same as those in BM-1 (11) respectively. Its computation complexity is still O(n) in sense of the times of scalar multiplication.

The above closed form in (16)-(17) is also valid for n=1. For convenience to model reduction, the form for n=1 is listed below:

$$A = \begin{bmatrix} -R_1/L_1 & -1/L_1 \\ 1/C_1 & 0 \end{bmatrix}, \quad (18)$$

$$B = [1/L_1 \ 0]^T,$$

$$C = [0 \ 1],$$

$$D = 0.$$

Thus, the state space model $\{A, B, C, D\}$ of BM-2 is established by the closed form (16)-(17).

section i with $c_{2i-1}=1$), within any branch of the ITLTAN as above discussion of the branch.

However, it is emphasized again that when using the above branch model as a component for building the total state space model of a tree or net, the above input matrix may be a zero matrix, if no direct source input to this branch. Also, the output matrix may be a zero matrix if no selected output variable from this branch. This remark is also valid for the following other branch models.

Here, the system matrix A has tri-diagonals: super-diagonal, diagonal and sub-diagonal, that hold all non-zero entries of the system matrix. All other entries are zeros. This is a special sparse matrix with a dimension of 2n×2n (or $2n_i \times 2n_i$ for branch i) where the branch degree is 2n, i.e., the branch has a model with independent n capacitors and n inductors. The source resistor $R_s$ presents in entry (1, 1) of the system matrix. Its load resistor $R_0$ presents in entry (2n, 2n), and load $C_0$ capacitor presents in entries (2n, 2n−1) and (2n, 2n), i.e., two entries of the last row.

Therefore, it is very clear that the computation complexity of this state space model of BM-1 is only O(n) in sense of the scalar multiplication times.

The corresponding method and algorithm for the above Method BM-1 are shown below.

Method BM-1 (branch model 1):
i) Set order 2n;
ii) Set the system matrix A as (10) if n>1; otherwise set A as (12) if n=1;
iii) Set the input matrix B, the output matrix C and the direct output matrix D (which may be omitted) as (11) respectively if the branch has a direct source input and an output variable of its branch terminal voltage, otherwise set it as a zero matrix respectively.

Thus, the state space model $\{A, B, C, D\}$ or $\{A, B, C\}$ is established for BM-1. It is clear that it is built by the closed form. Therefore, we will present the closed forms, but not restate the corresponding methods for the closed forms, and $\{A, B, C\}$ instead of $\{A, B, C, D\}$.

A.3. Branch Model 3 (BM-3)—Evenly Distributed with Load and Source Parts

Another special case is an evenly distributed interconnect and/or transmission line as shown in FIG. 4. That is the Branch Model 3 [BM-3]. In this case, all piece resistors, inductors and capacitors are respectively the same as $$R_i = R, \ C_i = c, \ L_i = L, \ i=1, \ldots, n. \quad (19)$$

They are related to the parasitic parameters of the interconnect and/or transmission line as $$R = R_t/n, \ c = C_t/n, \ L = L_t/n \quad (20)$$

where parasitic resistor $R_t$, capacitor $C_t$ and inductor $L_t$ are the "total" resistor, "total" capacitor and "total" inductor of the interconnect, respectively. Here, the quote is used for "total" because it is really distributed, not total.

FIG. 4 shows a BM-3 as an evenly distributed RLC interconnect or transmission line with the source and load parts. The exact state space model in closed form is as follows:

$$A = \begin{bmatrix} -(R_S+R)/L & -1/L_1 & 0 & 0 & \cdots & \cdots & \cdots & \cdots & \cdots & 0 \\ 1/c & 0 & -1/c & 0 & \cdot^{\cdot^{\cdot}} & & & & & \vdots \\ 0 & 1/L & -R/L & -1/L & 0 & \cdot^{\cdot^{\cdot}} & & & & \vdots \\ \vdots & 0 & 1/c & 0 & -1/c & 0 & \cdot^{\cdot^{\cdot}} & & & \vdots \\ \vdots & & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \vdots \\ \vdots & & & \cdot^{\cdot^{\cdot}} & 0 & \cdot^{\cdot^{\cdot}} & \cdot^{\cdot^{\cdot}} & \cdot^{\cdot^{\cdot}} & \cdot^{\cdot^{\cdot}} & \vdots \\ \vdots & & & & \cdot^{\cdot^{\cdot}} & \cdot^{\cdot^{\cdot}} & 1/L & -R/L & -1/L & 0 & 0 \\ \vdots & & & & & \cdot^{\cdot^{\cdot}} & \cdot^{\cdot^{\cdot}} & 1/c & 0 & -1/c & 0 \\ \vdots & & & & & & \cdot^{\cdot^{\cdot}} & 0 & 1/L & -R/L & -1/L \\ 0 & \cdots & \cdots & \cdots & \cdots & \cdots & \cdots & 0 & 1/(c+C_0) & -1/(c+C_0)R_0 \end{bmatrix} \quad (21)$$

$$B = [1/L \ 0 \vdots 0 \ \cdots \ \cdots \ 0]^T, \quad (22)$$

$$C = [0 \ \cdots \ \cdots \ 0 \vdots 0 \ 1]$$

and $$D = 0.$$

For a special case n=1, the above model is reduced to the follows:

$$A = \begin{bmatrix} -(R_s+R)/L & -1/L \\ 1/(c+C_0) & -1/(c+C_0)R_0 \end{bmatrix}, \quad (23)$$

$$B = [1/L \ 0]^T,$$

$$C = [0 \ 1],$$

$$D = 0.$$

It should be pointed out and emphasized that the above closed form involves only a constant times of scalar multiplication and division for any large order n (n>>1). It is less than 7. This means that its computation complexity is fixed and much less than O(n). That is O(1)! i.e., two Thus, the state space model {A, B, C, D} is established by the closed form (21-22) for the BM-3.

A.4. Branch Model 4 (BM-4)—Evenly Distributed Without Load and Source Parts One further special case—Branch Model 4 [BM-4]—is the evenly distributed interconnect and/or transmission line of BM-3 but without the source and load part elements. FIG. 5 shows a BM-4 as an evenly distributed interconnect or transmission line itself, without the source and load parts. Thus, it is also a special case of BM-2 with the special condition of even distribution of (19) and (20). It is also without any disturbance or distortion from various source and load parts. Its exact state space model in closed form for any n≧1 is as follows:

$$A = \begin{bmatrix} -R/L & -1/L & 0 & 0 & \cdots & \cdots & \cdots & 0 \\ 1/c & 0 & -1/c & 0 & \cdot^{\cdot^{\cdot}} & & & \vdots \\ 0 & 1/L & -R/L & -1/L & 0 & \cdot^{\cdot^{\cdot}} & & \vdots \\ \vdots & 0 & 1/c & 0 & -1/c & 0 & \cdot^{\cdot^{\cdot}} & \vdots \\ \vdots & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} \\ \vdots & & & \cdot^{\cdot^{\cdot}} & \cdot^{\cdot^{\cdot}} & \cdot^{\cdot^{\cdot}} & \cdot^{\cdot^{\cdot}} & 0 \\ \vdots & & & & 0 & 1/L & -R/L & -1/L \\ 0 & \cdots & \cdots & \cdots & \cdots & 0 & 1/c & 0 \end{bmatrix} \quad (24)$$

$$B = [1/L \ 0 \ \vdots \ 0 \ \cdots \ \cdots \ 0]^T,$$
$$C = [0 \ \cdots \ \cdots \ 0 \ \vdots \ 0 \ 1] \quad (25)$$
and
$$D = 0.$$

For convenience, a special case of n=1 as reduced from (24-25) is listed below:

$$A = \begin{bmatrix} -R/L & -1/L \\ 1/c & 0 \end{bmatrix}, \quad (26)$$
$$B = [1/L \ 0]^T,$$
$$C = [0 \ 1],$$
$$D = 0.$$

As pointed out above, the closed form (24)-(25) is valid for n=1.

It should be pointed out and emphasized that the above closed form involves only three times of scalar division/multiplication for any large order n (n>>1). This means that its computation complexity in the sense of scalar multiplication times is a constant 3, i.e., O(1)!

Thus, the state space model {A, B, C, D} for the BM-4 is established by the above closed form (24)-(25).

B. Calculating the Branch Connection and Non-Connection Models

In the general ITLTAN, two branches may connect or not connect each other. Therefore, the state space model and its closed form method need the connection model and the non-connection model in closed form. The state space model describes the dynamic evaluation of the state variables. Based on the connection feature and the system matrix structure, we further present the following models: a root-to-leaf connection model for describing the root branch state space variable dynamics, a leaf-to-root connection model for describing the leaf branch state variable dynamics, and a leaf-to-leaf connection model. They may be in short as a root-leaf connection model, a leaf-root connection model, and a leaf-leaf connection model, respectively. However, it may be seen late that we usually need only first two connection models in some sense because the last one is a zero block matrix.

For a leaf-to-leaf connection, it has really been presented by the connection of their branches to a same root. The connection models are for the description of the branch connection in the system matrix.

Now, we present the connection models in closed form as follows. They are the root-leaf connection model (CM-1 or CM-R-L), the leaf-root connection model (CM-2 or CM-L-R), and the leaf-leaf connection model (CM-3 or CM-L-L).

B.1. Connection Model 1 (CM-1)—Root Branch to Leaf Branch Connection Model (CM-R-L)

The Root-Leaf connection model CM-1 (CM-R-L) for a general RLC branch connection is $$A^{RL} = \begin{bmatrix} 0 & \cdots & \cdots & 0 \\ \vdots & \vdots & \vdots & \vdots \\ 0 & \cdots & \cdots & 0 \\ -1/(C_{n_R}^R + C_0^R) & 0 & \cdots & 0 \end{bmatrix} \quad (27)$$

where $C_{n_R}^R$ is the terminal capacitor of the root branch at its connection node, i.e., its $C_n$ in BM-1 and BM-2, or C in BM-3 and BM-4, $C_0^R$ is the load capacitor at the root branch models (may be 0), the matrix $A^{RL}$ has its row number as same as its root branch degree/dimension, i.e., $2n_R$, and its column number as same as its leaf branch degree/dimension, i.e., $2n_L$. Therefore, its dimension is $2n_R \times 2n_L$. In general, the dimension is $N_i^R \times N_j^L$ for the connection of the root branch i and the leaf branch j. The (model) block matrix has one non-zero entry with the parameter from the root capacitor (including its load capacitor if any) at the connection node.

B.2. Connection Model 2 (CM-2)—Leaf Branch to Root Branch Connection Model (CM-L-R)

The Leaf-Root connection model CM-2 (CM-L-R) for a general RLC branch connection is $$A^{LR} = \begin{bmatrix} 0 & \cdots & 0 & 1/L_1^L \\ 0 & 0 & 0 & 0 \\ \vdots & \vdots & \vdots & \vdots \\ 0 & \cdots & \cdots & 0 \end{bmatrix} \quad (28)$$

where $L_1^L$ is the inductor of the leaf branch at the connection node, i.e., $L_1$ in BM-1 and BM-2, or L in BM-3 and BM-4, the dimension of matrix $A^{LR}$ is $2n_L \times 2n_R$. In general, its dimension is $N_j^L \times N_i^R$ for the connection of the leaf branch j and the root branch i. It has one non-zero entry. The model is for the system matrix closed form.

B.3. Connection Model 3 (CM-3)—Leaf Branch to Leaf Branch Connection Model (CM-L-L)

The Leaf-Leaf connection model CM-3 (CM-L-L) for a general RLC branch connection is $$A^{LL} = 0 \quad (29)$$

It is a zero matrix with an appropriate dimension determined by these two leaf branch degrees, i.e., $N_i^L \times N_j^L$ or $N_j^L \times N_i^L$, where $N_i^L$ and $N_j^L$ are the degrees of the leaf branch i and the leaf branch j, respectively. For the above general RLC branches, it is $2n_{Li} \times 2n_{Lj}$, or $2n_{Lj} \times 2n_{Li}$.

Thus, we really only concern the connection between a root and a leaf in view of (29). As stated above, leaves connection is presented by these leaves connection to a same root. The leaves which connect to a same root certainly connect each other themselves. For determining the root and the leaf, the root branch is up-stream and the leaf branch is down-stream, from the source down to the leaf terminals.

B.4. Non-Connection Model (NCM)

As described in the above, the non-connection model is just a zero block matrix having an appropriate dimension. Its dimension has same property as connection models, i.e., either $2n_R \times 2n_L$, or $2n_L \times 2n_R$, or $2n_{Li} \times 2n_{Lj}$, or $2n_{Lj} \times 2n_{Li}$. It is $N_i \times N_j$ or $N_k \times N_i$ if branch i and branch j are not directly connected.

C. State Space Model by Closed Form for the ITLTAN

The state space model of the ITLTAN can be established based on the rules and methods presented in the above summary section.

In addition to the above section, we further show the methods to generate the state space model by the closed form for a general ITLTAN by applying the above described models. Consider an ITLTAN as shown in FIG. 1. It has 6 branches with a branch index as i=1, . . . , 6. At no loss of generality, let branch 1 be connected to the source as the root branch. Branch 1 has 3 leaf-branches as branches 2-4. Branch 4 has its 2 leaf-branches as branches 5 and 6. For example, the selected output variable is the terminal node voltage of Branch 6. Each branch has its degree $N_i$, i=1, . . . , 6. Then, its closed form of the state space model is as (4)-(6) as follows:

$$A = \begin{bmatrix} A_{11}^b & A_{12}^{RL} & A_{13}^{RL} & A_{14}^{RL} & 0 & 0 \\ A_{21}^{LR} & A_{22}^b & 0 & 0 & 0 & 0 \\ A_{31}^{LR} & 0 & A_{33}^b & 0 & 0 & 0 \\ A_{41}^{LR} & 0 & 0 & A_{44}^b & A_{45}^{RL} & A_{46}^{RL} \\ 0 & 0 & 0 & A_{54}^{LR} & A_{55}^b & 0 \\ 0 & 0 & 0 & A_{64}^{LR} & 0 & A_{66}^b \end{bmatrix} \quad (30)$$

$$B = [B_1^T \ 0 \ 0 \ 0 \ 0]^T, \quad (31)$$
$$C = [0 \ 0 \ 0 \ 0 \ 0 \ C_6],$$
$$D = 0$$

It is a favorable arrangement. The diagonal block matrices $A_{ii}^b$, i=1, . . . , 6, are selected from the branch models to represent 6 branches, respectively. They have their dimensions of $N_i \times N_i$, i=1, . . . , 6, respectively. The block matrices $A_{1i}^{LR}$, i=2, 3, 4, are selected from the CM-L-R model to represent the leaf-to-root connection of the leaf branches 2, 3 and 4 to their root branch 1, respectively. The block matrices $A_{54}^{LR}$ and $A_{64}^{LR}$ are selected from the CM-L-R model to represent the leaf-to-root connection of the leaf branches 5 and 6 to their root branch 4, respectively. The block matrices $A_{1i}^{RL}$, i=2, 3, 4, are selected from the CM-R-L model to represent the root-to-leaf connection of the root branch 1 to its leaf branches 2, 3 and 4, respectively. The block matrices $A_{45}^{RL}$ and $A_{46}^{RL}$ are selected from the CM-R-L model to represent the root-to-leaf connection of the root branch 4 to its leaf branches 5 and 6, respectively. All other block matrices of the system matrix A are zero matrices, to represent either non-connection or leaf-to-leaf connection. All block matrices have their appropriate dimensions, respectively. It is clear that the structure of the system matrix A represents the topology of the considered ITLTAN. In other words, it is an elegant topology mapping!

The input matrix B has only one non-zero block matrix $B_1$ from the root branch 1. Its other block matrices are zero matrices because other branches have no direct source input. The output matrix C has only one non-zero block matrix $C_6$ to select the output form the branch 6. It is pointed out that the block matrix $B_1$ has one non-zero entry at its first entry to represent the source input to its input terminal. The block matrix $C_6$ has one non-zero entry of 1 at its last entry to select its terminal node voltage as the output variable.

It is further pointed out that the input matrix B and the output matrix C can be directly set in view of the input and output selection as $$B = [b_1 0 \ldots 0]^T, C = [0 \ldots 0 \ 1] \quad (32)$$

where the dimension of matrix B is N×1, the dimension of matrix C is 1×N, and $b_1$ is from the branch input section circuit parameter, e.g., as in (11).

Section G will show the above methods further by experimental results with the detail ITLTAN data.

The above description clearly shows its novelty features to solve this broad open problem, and these elegant methods are unobvious over the prior art and all available knowledge in the art.

D. Model Reduction and Approximation Order

It has been shown how to calculate the exact state space model of the general ITLTAN via the above accurate closed-forms. However, calculating an exact model involves an order of thousands for a typical large distributed ITLTAN. In practice, there is no need to calculate a so high order model of general ITLTAN, since the transient behavior can be accurately characterized by low order model, e.g., by a small number of dominant poles (typically several tens of poles), i.e., the dominant eigenvalues of the system matrix. Now the above state space models generated by the proposed methods provide a new basis and a new starting point for model reduction, or model truncation, or model simplification, and further comparison. For example, the Balanced Truncation Method (BTM) can be applied to the above state space models for model reduction. By comparison to the original model, the approximation order of the reduced model can be determined by various approximation performance requirements, such as accuracy, transient response, frequency range, etc.

It is very powerful to reveal the relationship among the ELO simplification models and its original high order model. The method and relationship is as follows. It is mainly for each branch model simplification via the ELO method. Then, we form an order-reduced simplified state space model by applying these simplified branch models for the connection with the same topology as the original ITLTAN model via any of the above described approaches and methods.

Consider a 2n-th evenly distributed RLC interconnect branch line circuit shown in FIG. 5 with its "total" length resistor $R_t$, "total" capacitor $C_t$ and "total" inductor $L_t$ in (20). Thus, its original $2n^{th}$-order evenly distributed branch model is in (24)-(25). Its 2m-th ELO model $\{A_{em}, B_{em}, C_{em}, D\}$ or $\{A_{em}, B_{em}, C_{em}\}$ is $$A_{em} = \begin{bmatrix} -R/L & -1/rL & 0 & 0 & \cdots & \cdots & \cdots & 0 \\ 1/rC & 0 & -1/rC & 0 & \cdots & & & \vdots \\ 0 & 1/rL & -R/L & -1/rL & 0 & \cdots & & \vdots \\ \vdots & 0 & 1/rC & 0 & -1/rC & 0 & \cdots & \vdots \\ \vdots & \cdots & \cdots & \cdots & \cdots & \cdots & \cdots & \cdots \\ \vdots & & & \cdots & \cdots & \cdots & \cdots & 0 \\ \vdots & & & & 0 & 1/rL & -R/L & -1/rL \\ 0 & \cdots & \cdots & \cdots & \cdots & 0 & 1/rC & 0 \end{bmatrix} \quad (33)$$

$$B_{em} = [1/rL \ 0 \ \vdots \ 0 \ \cdots \ \cdots \ 0]^T, \quad (34)$$
$$C_{em} = [0 \ \cdots \ \cdots \ 0 \ \vdots \ 0 \ 1],$$
$$D = 0, n \geq 1$$

where $A_{em} \in R^{2m \times 2m}$, $B_{em} \in R^{2m \times 1}$, $C_{em} \in R^{1 \times 2m}$, parameters R, C and L are the parameters of the original 2n-th branch model based on the circuit data, and an order reduction ratio is $$r = n/m. \quad (35)$$

The above ELO branch model simplification method can also be extended to the even-distributed RLC interconnect branch line circuit with its source and load parts as shown in FIG. 4. Thus, its original $2n^{th}$-order evenly distributed branch model is in (21)-(22). Then, its 2m-th reduced order ELO state space model $\{A_{em}, B_{em}, C_{em}, D\}$ or $\{A_{em}, B_{em}, C_{em}\}$ is:

$$A_{em} = \begin{bmatrix} -(rR+R_S)/rL & -1/rL & 0 & 0 & \cdots & \cdots & \cdots & 0 \\ 1/rc & 0 & -1/rc & 0 & \cdots & & & \vdots \\ 0 & 1/rL & -rR/rL & -1/rL & 0 & \cdots & & \vdots \\ \vdots & 0 & 1/rc & 0 & -1/rc & 0 & \cdots & \vdots \\ \vdots & \cdots & \cdots & \cdots & \cdots & \cdots & \cdots & \cdots \\ \vdots & & & \cdots & \cdots & \cdots & \cdots & 0 \\ \vdots & & & & 0 & 1/rL & -rR/rL & -1/rL \\ 0 & \cdots & \cdots & \cdots & \cdots & 0 & 1/(rc+C_0) & -1/(rc+C_0)R_0 \end{bmatrix} \quad (36)$$

$$B_{em} = [1/rL \ 0 \ \vdots \ 0 \ \cdots \ \cdots \ 0]^T, \quad (37)$$
$$C_{em} = [0 \ \cdots \ \cdots \ 0 \ \vdots \ 0 \ 1],$$
$$D = 0, m > 1.$$

where $A_{em} \in R^{2m \times 2m}$, $B_{em} \in R^{2m \times 1}$, $C_{em} \in R^{1 \times 2m}$, parameters R, C and L are the parameters of the original 2n-th branch model, and the order reduction ratio is r=n/m in (35). For m=1, the ELO branch model is $$A_{em} = \begin{bmatrix} -(rR+R_s)/rL & -1/rL \\ 1/(rc+C_0) & -1/(rc+C_0)R_0 \end{bmatrix}, \quad (38)$$

$$B_{em} = [1/rL \ 0]^T,$$
$$C_{em} = [0 \ 1],$$
$$D = 0.$$

The above method shows that the ELO branch model with the source and load parts depends on its parameters, order reduction ratio r, and external parameters. There are two extreme situations for external parameters: one is interconnect itself without any distortion as BM-4, and another one is with large dominant external parameters. A regular case will be between these extreme cases. However, the reduced model for the interconnect itself can connect to various external source and load data.

Many optimization methods may be applied by combination with the above presented closed forms of the state space model as above pointed out. One way for the optimal model simplification (or model reduction) is to optimize the parameter r. Another way is to let the above order reduction ratio r be extended as an optimal parameter for a predetermined reduced 2m-th order branch model without the restriction of r=n/m. By the above methods, we connect all simplified branch models into a new simplified (or reduced order) state space model by keeping the original topology via the closed form approach as presented above.

E. Determining the Transient Response and the Bode Plots

Further, the above original models and their reduced order models can be used to determine and investigate their transient responses and Bode plots, i.e., their time domain performance and frequency domain performance, respectively. For example, some simple MATLAB command step(A,B,C,D) [or step(A,B,C,0)] for the step response, and bode(A,B,C,D) [or bode(A,B,C,0)] for Bode plot in frequency domain. These performance graphs and data can facilitate comparison of the original model and its reduced order model.

F. Complexity and Stability Characteristics

The methods just disclosed here have a computation complexity of O(N) for the state space models of the general ITLTAN via the corresponding closed forms, where N is the order of the ITLTAN, i.e., the sum of all branch line orders. It is emphasized again that the computation complexity is in the sense of scalar multiplication times, a more detailed and accurate account of the computation cost.

However, for evenly distributed general ITLTAN, the closed forms of the state space models have their computation complexity of O(1), i.e., only a fixed constant. It is usually true that interconnect and transmission line, tree and net consist of evenly distributed sub-interconnect and sub-transmission lines. Thus, the computation complexity of the new methods disclosed here for their state space models are the product of their sub-piece number times O(1), that is much less than O(N).

These new methods result the exact accurate models for the N-th order distributed general ITLTAN system. Therefore, these methods guarantee the derived models stability, and are also numerically stable for any order of the model. The methods also can be combined with scaling and other techniques.

The present invention methods are specifically efficient to model the distributed nature of the ITLTAN system because of the great simplicity of calculation in the state space models, the easy algorithms, the high accuracy, and especially, the elegance of the topology structure presentation and mapping.

G. Experimental Results

Said closed-forms in the state space model are much useful for time domain simulation and frequency domain simulation, especially the step response that is commonly used in test and evaluation.

The presented said methods will now be applied to calculate the transient response of step response and the Bode plots of frequency response of the ITLTAN. Two cases are considered here as examples. Case 1 is an evenly distributed interconnect and transmission line itself with its source and load parts as shown in FIG. 5, while Case 2 is an interconnect and transmission tree as shown in FIG. 1 with 6 branches, and its source and load parts. The resulting exact models are further used to derive the ELO reduced/simplified models. Then, the resulting step response and Bode plot of the original model are compared to the corresponding step response and Bode plot of its ELO simplified model, respectively.

Case 1. Consider an evenly distributed RLC interconnect BM-3 of 0.01 cm long with distribution characteristic data of resistor 5.5 k$\Omega$/m and capacitor 94.2 pF/m. An $200^{th}$-order model is used as its original model with $R=5.5 \cdot 10^{-3}\Omega$ and $C=9.42 \cdot 10^{-5}$ pF, while the inductor value L is calculated from the light speed in the material and the capacitor value C. It leads to $L=2.831 \times 10^{-13}$ H. Also, to show some feature of RLC interconnect, this distributed interconnect line has a source resistor $R_s=200\Omega$ and a load resistor $R_0=1M\Omega$, i.e., a kind of BM-3.

Case 2. Consider a distributed RLC interconnect tree with 6 evenly distributed interconnect branch lines connected as FIG. 1, as an example of a general ITLTAN to show the new methods described above. The branch lengths are as follows: $l_1=l_2=l_3=0.01$ cm and $l_4=l_5=l_6=0.005$ cm. Their distribution characteristic data are the same as Case 1, i.e., of resistor 5.5 k$\Omega$/m, capacitor 94.2 pF/m and $L=2.831 \times 10^{-7}$H/m. Take a branch order of 200 for each branch of branch 1-3, and 100 for each branch of branches 4-6. Thus, branches 1-3 have their parameters $R_{e1}=5.5 \cdot 10^{-3}\Omega$, $C_{e1}=9.42 \cdot 10^{-5}$ pF and $L_{e1}=0.2831$ pH, with order 200, i.e., $N_1^b=N_2^b=N_3^b=200$, and $n_1^b=n_2^b=n_3^b=100$. Branches 4-6 have the same parameters as $R_{e2}=5.5 \cdot 10^{-3}\Omega$, $C_{e2}=9.42 \cdot 10^{-5}$ pF and $L_{e2}=0.2831$ pH, but with order 100, i.e., $N_4^b=N_5^b=N_6^b=100$ and $n_4^b=n_5^b=n_6^b=50$. Branch 1 has a source resistor $R_s=200\Omega$. Branches 2, 3, 5 and 6 have their respective load $R_0 1$ M$\Omega$ and load capacitors $C_0=0.1$ F. Select the terminal voltage of branch 6 as an output for a demo.

Case 1. By applying BM-3 to Case 1, the 200-th order model $S=\{A,B,C,D\}$ is:

$$A = 10^{10} \cdot \begin{bmatrix} -7065.2 & -353.25 & 0 & 0 & \cdots & \cdots & \cdots & 0 \\ 1.0616E6 & 0 & -1.0616E6 & 0 & \cdot^{\cdot^{\cdot}} & & & \vdots \\ 0 & 353.25 & -1.9429 & -353.25 & 0 & \cdot^{\cdot^{\cdot}} & & \vdots \\ \vdots & 0 & 1.0616E6 & 0 & -1.0616E6 & 0 & \cdot^{\cdot^{\cdot}} & \vdots \\ \vdots & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} \\ \vdots & & & \cdot^{\cdot^{\cdot}} & \cdot^{\cdot^{\cdot}} & \cdot^{\cdot^{\cdot}} & \cdot^{\cdot^{\cdot}} & 0 \\ \vdots & & & & 0 & 353.25 & -1.9429 & -353.25 \\ 0 & \cdots & \cdots & \cdots & \cdots & 0 & 1.0616E6 & -1.0616 \end{bmatrix}_{200 \times 200} \quad (39)$$

$$B = [353.25E10 \quad 0 \quad \vdots \quad 0 \quad \cdots \quad \cdots \quad 0]^T, \quad (40)$$
$$C = [0 \quad \cdots \quad \cdots \quad 0 \quad \vdots \quad 0 \quad 1]_{1 \times 200}$$
and
$$D = 0 \text{ (or omitted)}.$$

Its step transient response is shown in FIG. 6 and Bode plot is shown in FIG. 7.

Case 2.A. By applying the methods presented above, we have the state space model by closed form for this distributed RLC interconnect tree as follows:

$$A = \begin{bmatrix} A_{11} & A_{12} & A_{13} & A_{14} & 0 & 0 \\ A_{21} & A_{22} & 0 & 0 & 0 & 0 \\ A_{31} & 0 & A_{33} & 0 & 0 & 0 \\ A_{41} & 0 & 0 & A_{44} & A_{45} & A_{46} \\ 0 & 0 & 0 & A_{54} & A_{55} & 0 \\ 0 & 0 & 0 & A_{64} & 0 & A_{66} \end{bmatrix},$$ (41)

$$B = \begin{bmatrix} 353.25E10 \\ 0 \\ \vdots \\ 0 \end{bmatrix}_{900 \times 1},$$

$$C = [0 \quad \cdots \quad 0 \quad 1]_{1 \times 900},$$
$$D = 0$$

$$A_0^b = 10^{10} \cdot \begin{bmatrix} -1.9429 & -353.25 & 0 & 0 & \cdots & \cdots & \cdots & 0 \\ 1.0616E6 & 0 & -1.0616E6 & 0 & \cdot^{\cdot^{\cdot}} & & & \vdots \\ 0 & 353.25 & -1.9429 & -353.25 & 0 & \cdot^{\cdot^{\cdot}} & & \vdots \\ \vdots & 0 & 1.0616E6 & 0 & -1.0616E6 & 0 & \cdot^{\cdot^{\cdot}} & \vdots \\ \vdots & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} \\ \vdots & & & \cdot^{\cdot^{\cdot}} & \cdot^{\cdot^{\cdot}} & \cdot^{\cdot^{\cdot}} & \cdot^{\cdot^{\cdot}} & 0 \\ \vdots & & & & 0 & 353.25 & -1.9429 & -353.25 \\ 0 & \cdots & \cdots & \cdots & \cdots & 0 & 1.0616E6 & 0 \end{bmatrix}_{F \times F}$$ (42)

$$A_{0l}^b = 10^{10} \cdot \begin{bmatrix} -1.9429 & -353.25 & 0 & 0 & \cdots & \cdots & \cdots & 0 \\ 1.0616E6 & 0 & -1.0616E6 & 0 & \cdot^{\cdot^{\cdot}} & & & \vdots \\ 0 & 353.25 & -1.9429 & -353.25 & 0 & \cdot^{\cdot^{\cdot}} & & \vdots \\ \vdots & 0 & 1.0616E6 & 0 & -1.0616E6 & 0 & \cdot^{\cdot^{\cdot}} & \vdots \\ \vdots & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} & \cdot^{\cdot^{\cdot}} \\ \vdots & & & \cdot^{\cdot^{\cdot}} & \cdot^{\cdot^{\cdot}} & \cdot^{\cdot^{\cdot}} & \cdot^{\cdot^{\cdot}} & 0 \\ \vdots & & & & 0 & 353.25 & -1.9429 & -353.25 \\ 0 & \cdots & \cdots & \cdots & \cdots & 0 & 999.06 & -9.9906E-4 \end{bmatrix}_{F \times F}$$ (43)

$$A_{22} = A_{33} = A_{0l}^b|_{F=200}, \quad A_{44} = A_0^b|_{F=100}, \quad A_{55} = A_{66} = A_{0l}^b|_{F=100}$$ (44)

$$A_0^{RL} = \begin{bmatrix} 0 & \cdots & \cdots & 0 \\ \vdots & \vdots & \vdots & \vdots \\ 0 & \cdots & \cdots & 0 \\ -1.0616E16 & 0 & \cdots & 0 \end{bmatrix}_{F \times H}, \quad A_0^{LR} = \begin{bmatrix} 0 & \cdots & 0 & 3.5325E12 \\ 0 & 0 & 0 & 0 \\ \vdots & \vdots & \vdots & \vdots \\ 0 & \cdots & \cdots & 0 \end{bmatrix}_{H \times F}$$ (45)

$$A_{12} = A_{13} = A_0^{RL}|_{200 \times 200}, \quad A_{14} = A_0^{RL}|_{200 \times 100}, \quad A_{45} = A_{46} = A_0^{RL}|_{100 \times 100}$$ (46)

$$A_{21} = A_{31} = A_0^{LR}|_{200 \times 200}, \quad A_{41} = A_0^{LR}|_{100 \times 200}, \quad A_{54} = A_{64} = A_0^{LR}|_{100 \times 100}$$ (47)

where $A_{11}$ is almost equal to $A_0^b$ with F=200 except that its (1,1) entry should be $-7065.2 \cdot 10^{10}$.

From the above case 2 as an example, it is very clear that the above presented methods makes a new frontier in the area.

Case 2.B. Consider the same evenly distributed RLC interconnect tree as in Case 2.A, but with its ELO simplified model. For a comparison, the ELO model takes a 4th order for each branch of branches 1-3 and a 2nd order for each branch of branches 4-6.

The ELO model of the state space from the closed form has the same topology as the original model shown in (41). However, it has a reduced order (dimension) of 18. The ELO model by the closed form is as follows:

$$A_{11}^{em} = 10^{10} \cdot \begin{bmatrix} -1.4149E3 & -7.065 & 0 & 0 \\ 2.1231E4 & 0 & -2.1231E4 & 0 \\ 0 & 7.065 & -1.9429 & -7.065 \\ 0 & 0 & 2.1231E4 & 0 \end{bmatrix}$$ (48)

$$A_{22}^{em} =$$ (49)

$$A_{33}^{em} = 10^{10} \cdot \begin{bmatrix} -1.9429 & -7.065 & 0 & 0 \\ 2.1231E4 & 0 & -2.1231E4 & 0 \\ 0 & 7.065 & -1.9429 & -1.413E1 \\ 0 & 0 & 9.5502E2 & -9.5502E-4 \end{bmatrix}$$

-continued $$A_{44}^{em} = 10^{10} \cdot \begin{bmatrix} -1.9429 & -7.065 \\ 2.1231E4 & 0 \end{bmatrix}, \quad (50)$$

$$A_{55}^{em} = A_{66}^{em}$$
$$= 10^{10} \cdot \begin{bmatrix} -1.9429 & -7.065 \\ 9.5502E2 & -9.5502E-4 \end{bmatrix}$$

$$A_{12}^{em} = A_{13}^{em} = \begin{bmatrix} 0 & 0 & 0 & 0 \\ 0 & 0 & 0 & 0 \\ 0 & 0 & 0 & 0 \\ -2.1231E14 & 0 & 0 & 0 \end{bmatrix}, \quad (51)$$

$$A_{14}^{em} = \begin{bmatrix} 0 & 0 \\ 0 & 0 \\ 0 & 0 \\ -2.1231E14 & 0 \end{bmatrix},$$

$$A_{21}^{em} = A_{31}^{em} = \begin{bmatrix} 0 & 0 & 0 & 7.065E10 \\ 0 & 0 & 0 & 0 \\ 0 & 0 & 0 & 0 \\ 0 & 0 & 0 & 0 \end{bmatrix},$$

$$A_{41}^{em} = \begin{bmatrix} 0 & 0 & 0 & 7.065E10 \\ 0 & 0 & 0 & 0 \end{bmatrix}, \quad (52)$$

$$A_{45}^{em} = A_{46}^{em} = \begin{bmatrix} 0 & 0 \\ -2.1231E14 & 0 \end{bmatrix},$$

$$A_{54}^{em} = A_{64}^{em} = \begin{bmatrix} 0 & 7.065E10 \\ 0 & 0 \end{bmatrix}$$

$$B^{em} = [7.065E10 \quad 0 \quad \vdots \quad 0 \quad \cdots \quad \cdots \quad 0]^T, \quad (53)$$
$$C^{em} = [0 \quad \cdots \quad \cdots \quad 0 \quad \vdots \quad 0 \quad \vdots \quad 1],$$
$$D = 0 \text{ (or omit } D\text{)}.$$

FIG. 8 and FIG. 9 respectively show the step response and Bode plot of the original model of order 900 and its ELO model of order 18 for comparison. It is shown that this ELO model of order 18 presents the time response very well for the 900-th original model. Their Bode plots are closed well also in a wide frequency range. It is observed that the Bode plot curve of the 900-th original model decays with a very high slope in frequency range above $6 \cdot 10^{13}$ Hz.

These new methods and techniques are very useful and effective for modeling and various model reductions as well as comparison for the ITLTAN (interconnect and transmission line, tree and net) systems.

It is found that the methods disclosed here are useful, stable and accuracy. Furthermore, they are also easy, simple and effective for use with low computation complexity and less time-cost, and especially, the elegant topology feature.

What is claimed is:

1. A method for generating a time-domain state space model of an interconnect or transmission tree or net for simulation, performance analysis, model reduction, or circuit design, including the steps of:
    forming the tree or net as predetermined branches connected as topology of said tree or net;
    forming branch models and connection models, wherein the connection models are selected from root-leaf connection, or leaf-root connection, or leaf-leaf connection models, or a combination thereof;
    forming a non-connection model, if there are branches not directly connected among said branches in said tree or net;
    wherein the models are block matrices; and
    building the state space model based on the above formed models according to the topology of said tree or net by utilizing a computer or a chip.

2. The method of claim 1, wherein number of the predetermined branches is k, and the method includes the steps of:
    (a) setting a model order for each branch, denoted as $N_i=1$, $i=1, \ldots, k$, then the order N of the system model of said tree or net is the sum of the branch orders, i.e., $N=\Sigma_{i=1}^{k} N_i$;
    (b) building an N×N system matrix, say A, which is formed by branch block matrices of the branch models, and connection block matrices of the connection models, and non-connection block matrices of the non-connection model if there are the branches which are not directly connected;
    (c) building an input matrix, say B, having an N×1 column vector which has a non-zero entry that is based on a circuit parameter of the branch which is directly connected to a source;
    (d) building an output matrix, say C, having an 1×N row vector which has a non-zero entry for selecting an output variable of said tree or net;
    whereby the time-domain state space model is formed based on said matrices A, B and C with respective appropriate dimensions.

3. The method of claim 2, wherein
    (a) the branch block matrices respectively have their dimensions of $N_i \times N_i$ for each branch i, $i=1, \ldots, k$;
    (b) the connection block matrices respectively have their dimensions of $N_i \times N_j$ and $N_j \times N_i$ for two directly connected branches i and j, where $i \neq j$, and i, $j \in \{1, \ldots, k\}$;
    (c) the non-connection block matrices respectively have their dimensions of $N_i \times N_j$ and $N_j \times N_i$ for two non-directly-connected branches i and j, where $i \neq j$, and i, $j \in \{1, \ldots, k\}$;
    (d) said system matrix A has its topological structure corresponding to the topology of said tree or net as follows: said matrix A has k×k block matrices, say $A_{ij}$, i, j= $1, \ldots, k$; the matrices $A_{ii}$, $i=1, \ldots, k$, at the diagonal of said matrix A, are the branch block matrices for the branches $i=1, \ldots, k$, respectively; the matrix $A_{ij}$, $i \neq j$, is a connection or non-connection block matrix if the branches i and j are directly connected or not directly connected, respectively.

4. The method of claim 2, wherein
    said connection block matrices include three different types of connection models, i.e., block matrices: a type of root-to-leaf connection model block matrix, a type of leaf-to-root connection model block matrix, and a type of leaf-to-leaf connection model block matrix.

5. The method of claim 2, wherein the method further including the steps of:
    building a direct output matrix D with an appropriate dimension;
    whereby the state space model is extended to be {A, B, C, D} by said matrices A, B, C and D.

6. The method of claim 2, wherein the system state space model {A, B, C} is arranged as an equivalent representation via any elementary transformation or similarity transformation.

7. The method of claim 1 where the steps of said method are performed by a software.

8. The method of claim 1 where the steps of said method are programmed into a hardware product.

9. A method for generating a time-domain state space model of an RLC interconnect or transmission line for simulation, performance analysis, model reduction, circuit design, or forming a tree or net, including the steps of setting a model order of an even number for the state space model, denoted as 2n;

forming said interconnect or transmission line as n sections in series from a source input terminal down to a final sink terminal with said source input terminal and n nodes, where n−1 nodes are conjunction nodes between the neighbor sections, and one end node is the final sink terminal;

taking the currents passing the inductors of said n sections and the voltages of said n nodes as its state variable vector, the source input as an input variable, and a node voltage or a section current as a selected output variable;

building a 2n×2n system matrix A with its non-zero entries on its diagonal line, super-diagonal line and sub-diagonal line, formulated from members of the resistors, inductors and capacitors of n sections of said interconnect or transmission line;

building an input matrix B having a 2n×1 column vector which has a non-zero entry formulated from the inductor value of the section which is directly connected to a source;

building an output matrix C having a 1×2n row vector which has a non-zero entry for selecting an output variable; and forming the time-domain state space model by said three matrices A, B and C stored in a computer or a chip.

10. The method of claim 9, wherein (a) the non-zero diagonal line entry of the system matrix A is based on the resistor value and the inductor value of its corresponding section;

(b) the super-diagonal line entry of the system matrix A is based on either the inductor value or the capacitor value of its corresponding section; and (c) the sub-diagonal line entry of the system matrix A is based on either the capacitor value or the inductor value of its corresponding section.

11. The method of claim 10, wherein (a) said n sections have their section index, say i, i=1, ..., n, and each section i has elements of a resistor $R_i$, an inductor $L_i$ and a capacitor $C_i$, its resistor $R_i$ and inductor $L_i$ are in series and connect to two nodes of section i, its capacitor $C_i$ connects to its downward node i of section i and a ground;

(b) said model further includes the external parameters of the interconnect or transmission line, such as a source resistor, say $R_s$, connected to a source signal and said source input terminal, a load resistor, say $R_0$, or a load capacitor, say $C_0$, or both $R_0$ and $C_0$ in parallel, connected to said final sink terminal and the ground;

(c) one end entry of said diagonal line of the system matrix A is further based on the source resistor value, i.e., $R_s$, and another end entry of said diagonal line of the system matrix A is further based on the load value, i.e., $R_0$, or $C_0$, or the both;

(d) one end entry of said sub-diagonal line of the system matrix A is further based on the load capacitor value $C_0$, if the load includes $C_0$;

whereby the established state space model is suitable to model said interconnect or transmission line including its external parameters.

12. The method of claim 9, wherein (a) said interconnect or transmission line is formulated as an evenly distributed interconnect or transmission line, i.e., its distributed resistors, inductors and capacitors have an even resistor value R, an even inductor value L and an even capacitor value C, respectively;

(b) said non-zero diagonal line entry of the system matrix is based on the resistor value R and the inductor value L;

(c) said super-diagonal entry of the system matrix is based on the inductor value L or the capacitor value C;

(d) said sub-diagonal entry of the system matrix is based on the capacitor value C or the inductor value L;

(e) said non-zero entry of the input matrix is based on the inductor value L.

13. The method of claim 12, wherein (a) said model includes the external parameters of the interconnect or transmission line, such as a source resistor, say $R_s$, connected to a source signal and said source input terminal, a load resistor, say $R_0$, or a load capacitor, say $C_0$, or the both $R_0$ and $C_0$ in parallel, connected to said final sink terminal and the ground;

(b) one end entry of said diagonal line of the system matrix A is further based on the source resistor value, and another end entry of said diagonal line of the system matrix A is further based on the load value, i.e., $R_0$, or $C_0$, or both;

(c) one end entry of said sub-diagonal line of the system matrix A is further based on the load capacitor value $C_0$, if the load includes $C_0$;

whereby the established state space model is suitable to model said evenly distributed interconnect or transmission line including its external parameters.

14. The method of claim 9 wherein the steps of said method are performed by a software.

15. The method of claim 9 wherein the steps of said method are programmed into a hardware product.

16. A method for generating a time-domain reduced order state space model of an interconnect or transmission tree or net for simulation, performance analysis, model reduction, or circuit design, including the steps of forming a reduced-order branch model;

forming a reduced-order connection model, wherein the connection model is selected from a root-leaf connection model, or a leaf-root connection model, or a leaf-leaf connection model, or a combination thereof, if the reduced order state space model has directly connected branches;

forming a reduced-order non-connection model, if the reduced order state space model has branches not directly connected;

wherein the above formed reduced-order models are block matrices; and building the reduced-order state space model based on the above formed reduced-order models according to the topological structure of said tree or net by utilizing a computer or a chip.

17. The method of claim 16, wherein (a) the tree or net is formed as predetermined k branches connected as the topology of said tree or net;

(b) a small order $M_i$, which is not larger than its original order, is set for branch i, i=1, ..., k, then a reduced order M of the system model of said tree or net is $M=\Sigma_{i=1}^{k} M_i$;

(c) an M×M system matrix A is built by a type of branch block matrices of the branch model, a type of connection block matrices of the connection model, and a type of non-connection block matrices of the non-connection model if there are branches not directly connected;

(d) said system matrix A has its topological structure corresponding to the topological structure of said tree or net as follows: said matrix A has k×k block matrices, say $A_{ij}$, i, j=1, ..., k; the branch block matrices are set at the diagonal of said matrix A, say $A_{ii}$, i=1, ..., k, for the branches i=1, ..., k, respectively; the matrix $A_{ij}$, i≠j, is a connection or non-connection block matrix if the branches i and j are directly connected or not directly connected, respectively;

(e) the branch block matrix $A_{ii}$ has its dimension of $M_i \times M_i$ for the each branch i=1, ..., k, respectively;

(f) the connection block matrices respectively have their dimensions of $M_i \times M_j$ and $M_j \times M_i$ for two directly connected branches i and j, where i≠j, i, j∈{1, ..., k};

(g) the non-connection block matrices respectively have their dimensions of $M_i \times M_j$ and $M_j \times M_i$ for two non-directly-connected branches i and j, where i≠j, i, j∈ {1, ..., k}, and they are zero block matrices;

(h) an input matrix B is formed having an M×1 column vector which has a non-zero entry that is based on a circuit parameter of the branch directly connected to a source;

(i) an output matrix C is formed having an 1×M row vector which has a non-zero entry for selecting an output variable of said tree or net;

(j) the time-domain reduced order state space model is formed based on said matrices A, B and C with respective appropriate dimensions.

18. The method of claim 17, further including the following steps of setting a model reduction performance criterion;

searching the parameter r as an optimal parameter r, or a set of the parameters $r_i$, i=1, ..., k, as a set of the optimal parameters $r_i$, i=1, ..., k, by minimizing the performance criterion;

whereby this method provides an optimized M-th order reduced state space model for the interconnect or transmission tree or net, that is a guaranteed stable and physical synthesizable reduced order model through this stable numerical method.

19. The method of claim 16 where the steps of said method are performed by a software.

20. The method of claim 16 where the steps of said method are programmed into a hardware product.

* * * * *